United States Patent
Fouche et al.

(12) 
(10) Patent No.: US 6,201,785 B1
(45) Date of Patent: Mar. 13, 2001

(54) PROCESS FOR TRANSMITTING A DIGITIZED SIGNAL ACCORDING TO OFDM TYPE MULTICARRIER MODULATION, TRANSMITTER AND RECEIVER FOR THE IMPLEMENTATION OF THE SAID PROCESS

(75) Inventors: Yvon Fouche, Chatenay Malabry; Tristan de Couasnon, Rennes, both of (FR)

(73) Assignee: Thomson-CSF, Paris (FR)

(*) Notice: Subject to any disclaimer, the term of this patent is extended or adjusted under 35 U.S.C. 154(b) by 0 days.

(21) Appl. No.: 08/753,766

(22) PCT Filed: Dec. 1, 1992

(86) PCT No.: PCT/FR92/01119

§ 371 Date: Jun. 1, 1995

§ 102(e) Date: Jun. 1, 1995

(87) PCT Pub. No.: WO94/13077

PCT Pub. Date: Sep. 9, 1994

Related U.S. Application Data

(63) Continuation of application No. 08/424,541, filed as application No. PCT/FR92/01119 on Dec. 1, 1992, now abandoned.

(51) Int. Cl.[7] .................................. H04J 11/00; H04J 1/00
(52) U.S. Cl. .................. 370/203; 370/208; 370/210; 370/343; 370/480
(58) Field of Search .................................. 370/19, 21, 23, 370/69.1, 6, 13, 203, 208, 210, 343, 480, 484; 375/200; 455/59

(56) References Cited

U.S. PATENT DOCUMENTS

| | | | |
|---|---|---|---|
| 3,742,149 | * 6/1973 | Yoshida et al. | 370/6 |
| 4,112,370 | * 9/1978 | Monsen | 370/6 |
| 4,385,378 | * 5/1983 | Kreutel, Jr. | 370/19 |
| 4,521,878 | * 6/1985 | Toyonaga | 370/19 |
| 4,811,021 | * 3/1989 | Yoshimoto et al. | 370/6 |
| 5,357,502 | * 10/1994 | Castelain et al. | 370/19 |
| 5,471,464 | * 11/1995 | Ikeda | 370/19 |

FOREIGN PATENT DOCUMENTS

9004893 * 5/1990 (WO).

* cited by examiner

Primary Examiner—William Luther
(74) Attorney, Agent, or Firm—Oblon, Spivak, McClelland, Maier & Neustadt, P.C.

(57) ABSTRACT

The present invention relates to a process for transmitting a digitized signal according to OFDM (Orthogonal Frequency Division Multiplexing) type multicarrier modulation using N orthogonal channels. In accordance with the present invention, the channels are divided into two, N/2 channels corresponding to a first frequency band being sent via a first transmission track (3A, 4A, 5A, 6A, 7A) according to a first polarization and the remaining N/2 channels being brought back into the same frequency band and sent via a second transmission track (3B, 4B, 5B, 6B, 7B) according to a second polarization crossed with respect to the first.

17 Claims, 3 Drawing Sheets

PROCESS FOR TRANSMITTING A DIGITIZED SIGNAL ACCORDING TO OFDM TYPE MULTICARRIER MODULATION, TRANSMITTER AND RECEIVER FOR THE IMPLEMENTATION OF THE SAID PROCESS

This application is Continuation of application Ser. No. 08/424,541, filed on Jun. 1, 1995, now abandoned, which is a 371 application of PCT/FR92/01119 filed on Dec. 1, 1992.

BACKGROUND OF THE INVENTION

1. Field of the Invention

The present invention relates to a process for transmitting a digitized signal according to OFDM (Orthogonal Frequency Division Multiplexing) type multicarrier modulation using N orthogonal channels. The present invention also relates to a transmitter and a receiver for the implementation of this process.

2. Discussion of Background

In the international Patent Application PCT/FR 89/00546 filed in the name of THOMSON-CSF, there is described a particularly high-performance process for transmission using OFDM type multicarrier modulation making it possible to transmit, with a high density, a digitized signal. In the transmission process described, a plurality of orthogonal frequencies is used and an (amplitude/phase) or (real part/imaginary part) pair is transmitted on each frequency, the amplitude/phase or real part/imaginary part pair being one-to-one equivalent to the information to be sent. Moreover, in order to recover at the receiver the information sent according to this process whilst taking into account multiple echoes, various techniques are used such as the associating with the useful transmission interval of a transition interval or guard interval, the use of synchronization signals and especially the use of test-packets which, on reception, enable equalization of the channels to be performed. However, when wishing to use a very large number N of channels, for example 1024 channels, there is in this case a very large spectral occupancy. Indeed, the frequency band used is at least 16 MHz. This poses a number of problems in regard, for example, to the frequency of operation of the signal processing circuits.

SUMMARY OF THE INVENTION

The purpose of the present invention is to propose a novel process for transmitting a digitized signal according to OFDM type multicarrier modulation which enables the frequency band used to be narrowed.

The purpose of the present invention is also to propose a process for transmitting a digitized signal according to OFDM type multicarrier modulation using N orthogonal channels, which can be used equally well with modulation of the type described in international Patent Application PCT/FR 89/00546 as with other OFDM type multicarrier modulations.

Accordingly, the subject of the present invention is a process for transmitting a digitized signal according to OFDM (Orthogonal Frequency Division Multiplexing) type multicarrier modulation using N orthogonal channels, characterized in that the channels are divided into two, N/2 channels corresponding to a first frequency band being sent via a first transmission track according to a first polarization and the remaining N/2 channels being brought back into the same frequency band and sent via a second transmission track according to a second polarization crossed with respect to the first.

By using this novel transmission process it is possible to have a much larger number of channels for the same frequency band. Moreover, independence between channels is achieved owing to the fact that each channel is orthogonal to the other channels. Thereby, the maximum amplitude of a channel corresponds to the zero of all the other channels as explained in the abovementioned PCT application. Accordingly, if there is coupling between the two polarizations each transporting half of the channels, on decoding, its influence on the channels is minimized.

According to another characteristic of the present invention, the digitized signal transmitted on each track includes, periodically, test-packets allowing the send channel to be equalized on reception.

This feature makes it possible to compensate in particular for the attenuation of one polarization with respect to the other, from the moment when the variations in the conditions of propagation of a polarization are slower than an equalization cycle.

According to a particular embodiment, two successive test-packets are transmitted per track and the test-packets are chosen in such a way that:

$$t_A^1(2q) \neq 0; \quad t_A^2(2q) = 0; \quad t_B^1(2q) = 0; \quad t_B^2(2q) \neq 0$$
$$t_A^1(2q+1) = 0; \quad t_A^2(2q+1) \neq 0; \quad t_B^1(2q+1) \neq 0; \quad t_B^2(2q+1) = 0.$$

The present invention also relates to a transmitter for the implementation of the above process, characterized in that it principally includes a circuit for calculating an inverse fast Fourier transform ($FFT^{-1}$) for N samples, a first send track for N/2 samples and a second send track for the remaining N/2 samples, the two tracks allowing sending in one and the same frequency band but with cross-polarizations.

The subject of the present invention is also a receiver for receiving signals transmitted according to the above process, characterized in that it includes two reception tracks each able to receive the signals corresponding to N/2 samples, transmitted in one and the same frequency band but with cross-polarizations and a circuit for calculating a fast Fourier transform (FFT) enabling N samples to be processed or, according to a variant embodiment, a circuit for calculating a fast Fourier transform (FFT) enabling N/2 samples to be processed, connected at the output of each track and a circuit for coupling the two circuits for calculating a fast Fourier transform (FFT).

BRIEF DESCRIPTION OF THE DRAWING

Other features and advantages of the present invention will emerge on reading the description given below of various embodiments, this description being given with reference to the attached drawings in which.

DETAILED DISCUSSION OF THE PREFERRED EMBODIMENTS

Figure 1:
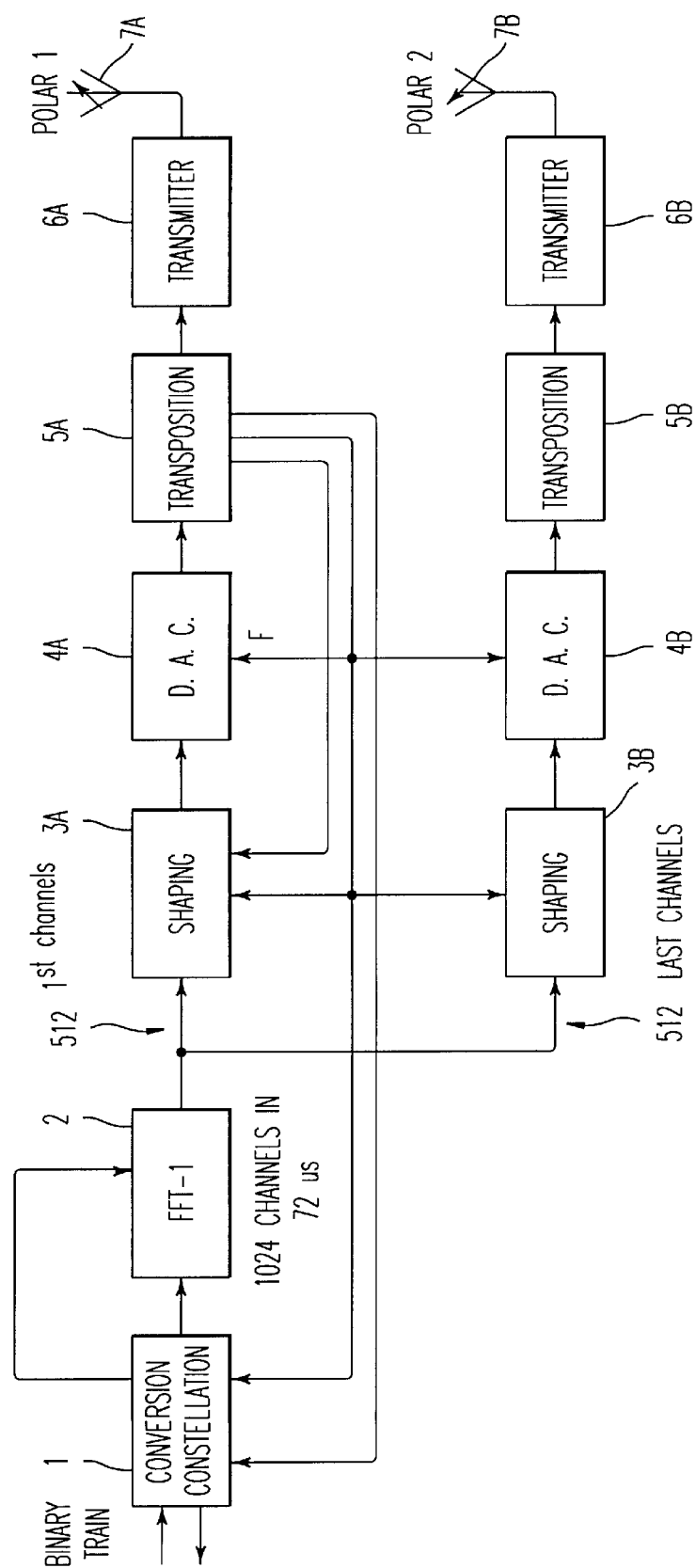
FIG. 1 is a schematic diagram of a transmitter for the implementation of the transmission process according to the present invention.

The transmitter and the receiver which are described below are circuits used to transmit and receive digitized signals, using OFDM (Orthogonal Frequency Division Multiplexing) type multicarrier modulation using N orthogonal channels. In this case and as described in the abovementioned PCT patent application, the digitized signal is chopped up into a succession of packets. The useful part of the signal is therefore made up of N sinusoidal signals each modulated in amplitude and in phase. In the context of the PCT patent described above, in order to take into account the multiple paths due to echoes and to more easily determine the useful signal, a transition interval or guard interval is defined corresponding to the start of the packet followed by the useful part of the signal which alone will be utilized at reception. In order to carry out the modulation in amplitude and in phase, a constellation in the complex plane is used in a known manner. As mentioned in the patent application cited, several types of constellations can be chosen, namely rectangular, hexagonal or circular constellations. Thus, as represented in FIG. 1, the binary train issuing from a coder, not represented, and corresponding to the digitized signal to be sent is dispatched at the input of a constellation conversion card 1 which matches the input bits grouped together by N and the points of the constellation which are allocated to each sub-carrier. It is at the constellation/conversion circuit that synchronization information together with test-packets which will be described later and which are used for the equalization of the channel are also inserted into the signal to be sent. This test-packet inserted in place of a packet conveying information serves on reception by comparison with a reference packet to determine correction coefficients to be applied to the following useful packet. This enables equalization of the channel to be carried out.

The data output by the circuit 1 are dispatched to a circuit for calculating an inverse fast Fourier transform (FFT$^{-1}$)2. The circuit for calculating an inverse Fourier Transform has been described in Patent Application PCT/FR 89/00546 to which reference may be made for a more complete description of its operation. The circuit 2 makes it possible to carry out the modulation of N channels on transmission, for example of 1024 channels in 72 microseconds, especially in the case in which it is desired to send television transmissions.

In accordance with the present invention, in order to limit the passband which, in the case of 1024 channels, must be 16 MHz, it is proposed in the present invention to split the channels into two and to dispatch the first 512 channels over a first send track and the last 512 channels over a second send track. As represented in FIG. 1, each send track essentially includes a shaping circuit 3A, 3B, a digital/analog converter 4A, 4B, a circuit for transposing the baseband frequency into intermediate frequency 5A, 5B and a transmitter proper 6A, 6B dispatching the signal to be sent to an antenna 7A, 7B.

In more detail, the shaping circuits 3A, 3B serve to put the data issuing from the circuit 2 for calculating an inverse fast Fourier Transform (FFT$^{-1}$) into the format which can be utilized by the digital/analog conversion circuit and to append the transition interval or guard interval when using a transmission process with a guard interval, as described in the abovementioned patent application. The data issuing from the shaping circuits 3A, 3B are dispatched to a digital/analog converter 4A or 4B controlled by a sampling frequency F and which makes it possible to obtain an analog signal which it will be possible to modulate. The purpose of the transposition circuits 5A and 5B is to transform the frequency of the analog signal into an intermediate frequency which the transmitter will be able to utilize.

Moreover, the transposition circuit 5B makes it possible to reduce the frequency of the analog signal of this track down into the same frequency band as the signal sent via the first track. These signals issuing from the two transposition circuits 5A and 5B are each dispatched to a transmitter proper 6A, 6B of conventional type which dispatches the signal to an antenna 7A and 7B.

In accordance with the present invention, the antennae 7A and 7B transmit the signal according to cross-polarizations. Thus for example, the signal dispatched by the antenna 7A is transmitted with horizontal polarization whilst the signal dispatched by the antenna 7B is transmitted with vertical polarization, these two signals being transmitted in the same frequency band.

Figure 2:
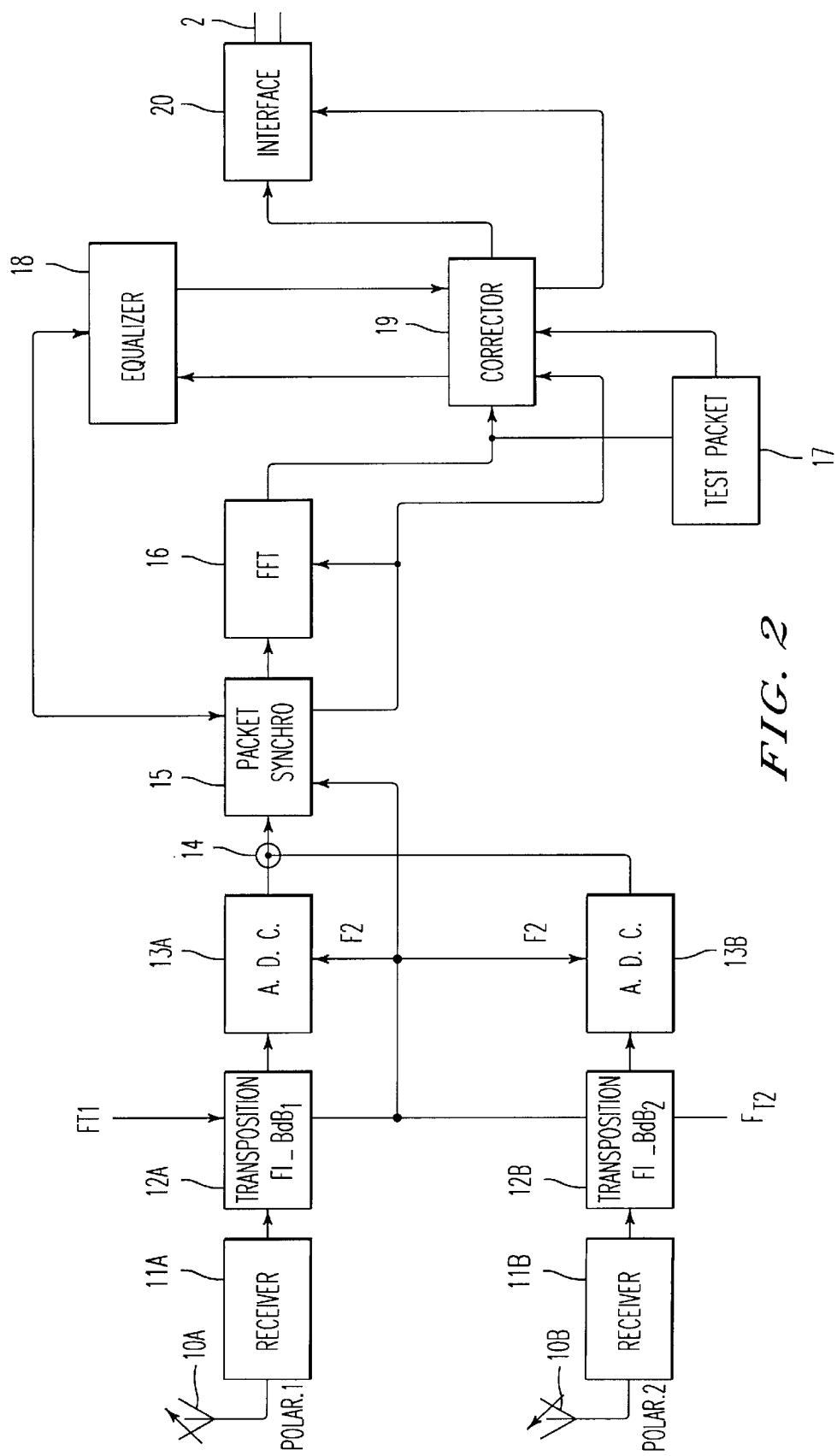
FIG. 2 is a schematic diagram of a receiver for receiving signals transmitted according to the process according to the present invention.

An embodiment of a receiver making it possible to receive a signal transmitted according to the process described above will now be described, more particularly with reference to FIG. 2. This receiver includes two reception tracks in parallel, each consisting of an antenna 10A, 10B, a receiver 11A, 11B, an intermediate frequency to baseband 1 and intermediate frequency to baseband 2 transposition circuit, 12A, 12B respectively, and an analog/digital converter 13A, 13B. The outputs from the two analog/digital converters are dispatched through an adder 14 at the input of a packet synchronization circuit 15 and of the demodulation circuit 16 which will be described in more detail below. The antennae 10A and 10B are cross-polarization antennae making it possible to receive the signals transmitted by the two antennae 7A and 7B with cross-polarization. The receivers 11A and 11B are receivers of conventional type which need not be detailed here. The transposition circuits 12A and 12B make it possible to pass from the intermediate frequency in which the baseband signals 1 are transmitted for the first reception track and baseband signals 2 for the second reception track. The transposition circuits consist essentially of a mixer receiving on one of its inputs a signal, at the transposition frequency, issuing from an oscillator. The analog/digital converters 13A, 13B make it possible to transform at the sampling frequency F2 the analog signal into a digital signal. These two signals are added together in an adder 14 before being dispatched to the demodulation part of the system which is identical to that described in the PCT patent application cited above. As represented in FIG. 2, this demodulation part includes a packets-synchro circuit 15 the purpose of which is to carry out the temporal chopping of the signal into packets so as to provide a circuit for calculating the fast Fourier Transform (FFT) 16 with only the useful part of the packets by using the synchronization information sent together with the signal. This part also includes at the output of the circuit for calculating the fast Fourier Transform (FFT) 16, a circuit 17 for detecting the test-packets dispatching information to a correction circuit 19 and an equalization circuit 18 charged with the calculations of the correction coefficients which transmits to the correction circuit 19 a correction signal for each packet. The elements issuing from the correction circuit are dispatched to an interface 20 which transforms the information received into a binary train transmitted on the line 21. The use of test-packets makes it possible to carry out equalization and to remedy the attenuation which may exist between the two polarizations.

Figure 3:
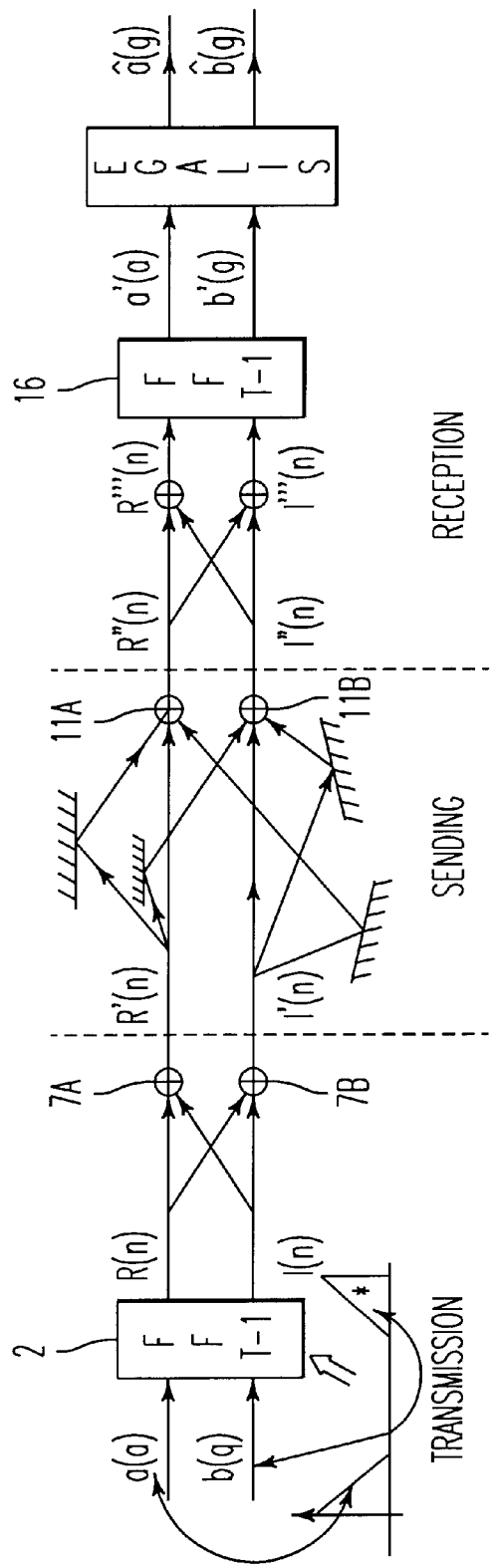
FIG. 3 is a simplified schematic diagram explaining the choice of the test-packets.

A way of calculating the value of the test-packets to be dispatched in order to carry out correct equalization of the channels while taking account of coupling of transmission, sending and receiving, will now be described with reference to FIG. 3. As represented in FIG. 3, at the output of the (FFT$^{-1}$) circuit 2, the signal R(n) and the signal I(n) which correspond to the real part and to the imaginary part are transmitted on each track respectively.

If account is taken of the couplings which occur respectively at the circuit 2 and at the antennae 7A and 7B, then in transmission, once the steady state is reached, the following equations hold:

$FFT^{-1}$ coupling $$r(q) = \frac{1}{2}[a(q) + b(q)]$$

$$i(q) = +\frac{1}{2j}[a(q) - b(q)]$$

where
$$r(q) = FFT[R(n)]$$
$$i(q) = FFT[I(n)]$$

Antenna coupling $$r'(q) = r(q) + K_{IR}\, i(q)$$

$$i'(q) = K_{IR}\, r(q) + i(q)$$

Hence the signals R' (n) are transmitted via the antenna 7A and the signals I' (n) are transmitted via the antenna 7B. Signals R'' (n) and I'' (n) respectively, which take into account the couplings and the multiple echoes, are received on the reception antennae 10A and 10B. These signals are given by the following equations:

$$R''(t) = \sum_i \alpha_R^i(t) * R'(t - t_i) + \sum_j \alpha_I^j(t) * I'(t - t_j)$$

$$I''(t) = \sum_R \alpha_R^k(t) * R'(t - t_R) + \sum_l \alpha_I^l(t) * I'(t - t_l)$$

or, going over to frequency:

$$r''(q) = r'(q)\left[\sum_i \alpha_R^i(q) e^{-j\varphi(q,t_i)}\right] + i'(q)\left[\sum_j \alpha_R^j(q) e^{-j\varphi(q,t_j)}\right]$$

$$i''(q) = r'(q)\left[\sum_n \alpha_R^R(q) e^{-j\varphi(q,t_R)}\right] + i'(q)\left[\sum_l \alpha_I^l(q) e^{-j\varphi(q,t_l)}\right]$$

which can written in the following form on putting for example $$C_{RR} = \sum_i \alpha_R^i(q) e^{-j\varphi(q,t_i)}$$

$$r''(q) = C_{RR}(q) r'(q) + C_{IR}(q) i'(q)$$

$$i''(q) = C_{RI}(q) r'(q) + C_{II}(q) i'(q)$$

On reception, these couplings at the antennae 10A, 10B and at the circuit for calculating a fast Fourier Transform 16 can be represented by the following equations:

Antennae coupling $$r'''(q) = r''(q) + K'_{IR}\, i''(q)$$

$$i'''(q) = K'_{RI}\, r''(q) + i''(q)$$

FFT coupling $$a'(q) = r'''(q) + j i'''(q)$$

$$b'(q) = r'''(q) - j i'''(q)$$

Thus at the output of the FFT 16, the set can be rewritten in matrix form as follows:

$$\begin{pmatrix} a'(q) \\ b'(q) \end{pmatrix} =$$

$$\underbrace{\begin{pmatrix} +1 & j \\ +1 & -j \end{pmatrix}\begin{pmatrix} 1 & K'_{IR} \\ K'_{RI} & C_{II} \end{pmatrix}\begin{pmatrix} C_{RR} & C_{IR} \\ C_{RI} & C_{II} \end{pmatrix}\begin{pmatrix} 1 & K_{IR} \\ K_{RI} & 1 \end{pmatrix}\begin{pmatrix} \frac{1}{2} & +\frac{1}{2} \\ -j/2 & j/2 \end{pmatrix}}_{M(q)}\begin{pmatrix} a\ (q) \\ b-(q) \end{pmatrix}$$

or, taking the inverse matrix:

$$\begin{pmatrix} a(q) \\ b(q) \end{pmatrix} = \begin{pmatrix} \alpha(q) & \beta(q) \\ \gamma(q) & \delta(q) \end{pmatrix}\begin{pmatrix} a'(q) \\ b'(q) \end{pmatrix}$$

Moreover, the signals $\hat{a}(q)$, $\hat{b}(q)$ are obtained at the output of the equalization circuit. These signals are such that:

$$\begin{pmatrix} \hat{a}(q) \\ \hat{b}(q) \end{pmatrix} = \begin{pmatrix} \hat{\alpha}(q) & \hat{\beta}(q) \\ \hat{\gamma}(q) & \hat{\delta}(q) \end{pmatrix}\begin{pmatrix} a'(q) \\ b'(q) \end{pmatrix}$$

Now, with the equalization, signals are recovered such that:

$$\begin{pmatrix} a(q) \\ b(q) \end{pmatrix} = \begin{pmatrix} \hat{a}(q) \\ \hat{b}(q) \end{pmatrix}$$

We must therefore estimate the matrix $$\begin{pmatrix} \hat{\alpha}(q) & \hat{\beta}(q) \\ \hat{\gamma}(q) & \hat{\delta}(q) \end{pmatrix}$$

In accordance with the present invention, in order to estimate this matrix, two test-packets are transmitted per track, i.e:

$$t_A^1, t_B^1, t_A^2, t_B^2 \quad \text{and we receive} \quad t'^1_A, t'^1_B, t'^2_A, t'^2_B$$

$$t_A^1(q) = \alpha(q) t'^1_A(q) + \beta(q) t'^1_B(q)$$

$$t_A^2(q) = \alpha(q) t'^2_A(q) + \beta(q) t'^2_B(q)$$

$$t_B^1(q) = \gamma(q) t'^1_A(q) + \delta(q) t'^1_B(q)$$

$$t_B^2(q) = \gamma(q) t'^2_A(q) + \delta(q) t'^2_B(q)$$

We put: $\Delta = t'^1_A(q) t'^2_B(q) - t'^1_B(q)$ and it follows that:

$$\hat{\alpha}(q) = \frac{t_A^1(q) t'^2_B(q) - t_A^2(q) t'^1_B(q)}{\Delta}$$

$$\hat{\beta}(q) = \frac{t_A^2(q) t'^1_A(q) - t_A^1(q) t'^2_A(q)}{\Delta}$$

$$\hat{\gamma}(q) = \frac{t_B^1(q) t'^2_B(q) - t_B^2(q) t'^1_B(q)}{\Delta}$$

-continued $$\hat{\delta}(q) = \frac{t_B^2(q)t_A'^1(q) - t_B^1(q)t_A'^2(q)}{\Delta}$$

The test-packets are then chosen such that:

$$t_A^1(2q) \neq 0; \quad t_A^2(2q) = 0; \quad t_B^1(2q) = 0; \quad t_B^2(2q) \neq 0$$

$$t_A^1(2q+1) = 0; \quad t_A^2(2q+1) \neq 0; \quad t_B^1(2q+1) \neq 0; \quad t_B^2(2q+1) = 0$$

We then have:

$$\hat{\alpha}(2q) = t_A^1(2q)t_B'^2(2q) \times \frac{\Delta^*}{\|\Delta\|^2}$$

$$\hat{\beta}(2q) = t_A^1(2q)t_A'^2(2q) \times \frac{\Delta^*}{\|\Delta\|^2}$$

$$\hat{\gamma}(2q) = t_B'^1(2q)t_B^2(2q) \times \frac{\Delta^*}{\|\Delta\|^2}$$

$$\hat{\delta}(2q) = t_B^2(2q)t_A'^1(2q) \times \frac{\Delta^*}{\|\Delta\|^2}$$

$$\hat{\alpha}(2q+1) = -t_A^2(2q+1)t_B'^1(2q+1) \times \frac{\Delta^*}{\|\Delta\|^2}$$

$$\hat{\beta}(2q+1) = -t_A^2(2q+1)t_A'^1(2q+1) \times \frac{\Delta^*}{\|\Delta\|^2}$$

$$\hat{\gamma}(2q+1) = -t_B^1(2q+1)t_B'^2(2q+1) \times \frac{\Delta^*}{\|\Delta\|^2}$$

$$\hat{\delta}(2q+1) = -t_B^1(2q+1)t_A'^2(2q+1) \times \frac{\Delta^*}{\|\Delta\|^2}$$

Thus, with a specific choice of the test-packets it is possible easily to recover the signals transmitted with cross-polarization in one and the same frequency band when employing OFDM type modulation.

Figure 4:
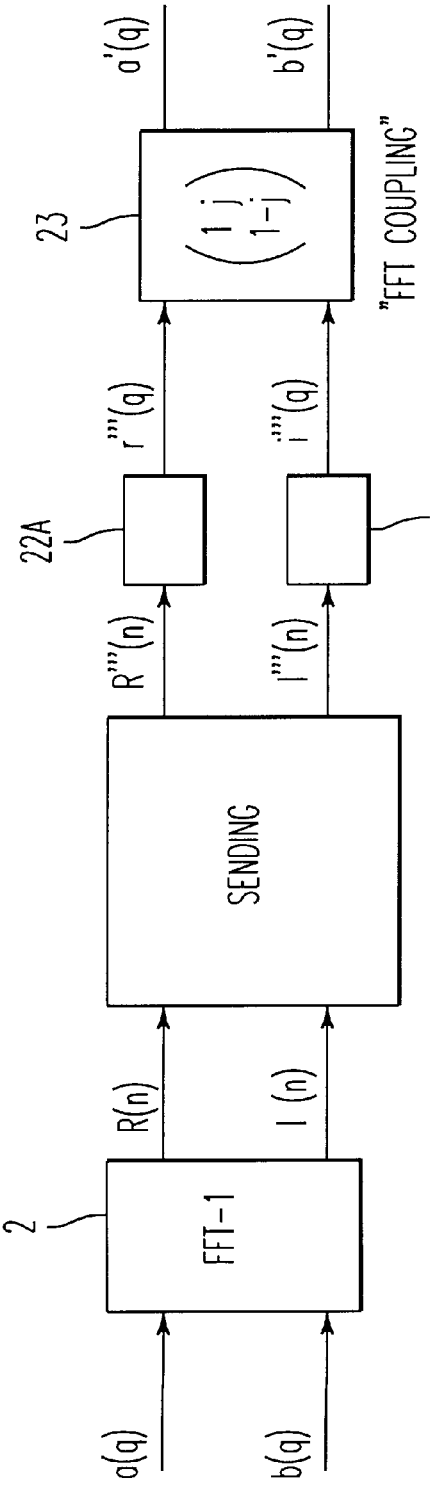
FIG. 4 is a simplified schematic diagram of another embodiment of the send chain according to the present invention.

According to another embodiment represented in FIG. 4, two circuits for calculating a fast Fourier Transform 22A, 221 can be used in reception. Each circuit is provided on a reception track and yields signals r''' (q) and i''' (q) respectively at output. In this case, it is necessary to recreate the coupling between the real parts/imaginary parts and the wavetrains represented by the signals a' (q), b' (q). This is carried out by the coupling circuit 23 which performs the following operation:

$$\begin{pmatrix} a'(q) \\ b'(q) \end{pmatrix} = \begin{pmatrix} 1+j \\ 1-j \end{pmatrix} \begin{pmatrix} r'''(q) \\ i'''(q) \end{pmatrix}$$

In this case also, we can write:

$$\begin{pmatrix} a(q) \\ b(q) \end{pmatrix} = \begin{pmatrix} \alpha(q) & \beta(q) \\ \gamma(q) & \delta(q) \end{pmatrix} \begin{pmatrix} a'(q) \\ b'(q) \end{pmatrix} \text{ where the matrix } \begin{pmatrix} \alpha & \beta \\ \gamma & \delta \end{pmatrix}$$

is the same as before.

FIGS. 3 and 4 have been described whilst referring to the case in which the imaginary parts are transmitted on one track and the real parts on another track. However, the invention applies also to the case in which the signals are simply split into two, the first N/2 being transmitted on one track and the last N/2 on the other track.

What is claimed is:

1. Process for transmitting a digitized signal, comprising the steps of:
    applying an inverse Fourier transform to said digitized signal to be transmitted in order to obtain N orthogonal channels corresponding to a first large frequency band;
    splitting said N channels into two in order to divide said large frequency band into a first and a second frequency band each containing an exclusive portion of said N orthogonal channels;
    transposing said second frequency band in said first frequency band to provide a transposed frequency band;
    transmitting said first frequency band in a first polarization mode; and
    transmitting said transposed frequency band in a second polarization mode.

2. A process according to claim 1, characterized in that the digitized signal is transmitted so that said first and second polarization modes are provided on a corresponding first and second track and the digitized signal transmitted on each track includes, periodically, test-packets allowing the send channel to be equalized on reception.

3. Process according to claim 2, characterized in that two successive test-packets are transmitted per track.

4. The process according to claim 3, characterized in that the test-packets are chosen in such a way that:

$$t_A^1(2q) \neq 0; \quad t_A^2(2q) = 0; \quad t_B^1(2q) = 0; \quad t_B^2(2q) \neq 0;$$

$$t_A^1(2q+1) = 0; \quad t_A^2(2q+1) \neq 0; \quad t_B^1(2q+1) \neq 0; \quad t_B^2(2q+1) = 0;$$

where the subscript represents the transmission track number, the superscript represents a test-packet number and q represents the index of a sample undergoing inverse Fourier Transform.

5. Transmitter for the implementation of the process according to claim 1, characterized in that it comprises a circuit for inverse fast Fourier transform ($FFT^{-1}$) for N samples, a first send track for N/2 samples and a second send track for the remaining N/2 samples, each track comprising a digital to analog converter for the conversion of the samples into an analog signal, a frequency transposition circuit of the analog signal for the transmission of the signal of each track in the same frequency band, an emitter to feed an antenna with the transposed signal, the antenna transmitting according to a cross polarization.

6. Transmitter for the implementation of the process according to claim 2, characterized in that it comprises a circuit for inverse fast Fourier transform ($FFT^{-1}$) for N samples, a first send track for N/2 samples and a second send track for the remaining N/2 samples, each track comprising a digital to analog converter for the conversion of the samples into an analog signal, a frequency transposition circuit of the analog signal for the transmission of the signal of each track in the same frequency band, an emitter to feed an antenna with the transposed signal, the antenna transmitting according to a cross polarization.

7. Transmitter for the implementation of the process according to claim 3, characterized in that it comprises a circuit for inverse fast Fourier transform ($FFT^{-1}$) for N samples, a first send track for N/2 samples and a second send track for the remaining N/2 samples, each track comprising a digital to analog converter for the conversion of the samples into an analog signal, a frequency transposition circuit of the analog signal for the transmission of the signal of each track in the same frequency band, an emitter to feed an antenna with the transposed signal, the antenna transmitting according to a cross polarization.

8. Transmitter for the implementation of the process according to claim 4, characterized in that it comprises a circuit for inverse fast Fourier transform ($FFT^{-1}$) for N samples, a first send track for N/2 samples and a second send track for the remaining N/2 samples, each track comprising a digital to analog converter for the conversion of the samples into an analog signal, a frequency transposition circuit of the analog signal for the transmission of the signal of each track in the same frequency band, an emitter to feed an antenna with the transposed signal, the antenna transmitting according to a cross polarization.

9. Receiver for receiving signals transmitted according to the process of claim 1, characterized in that it includes two reception tracks, each able to receive the signals corresponding to N/2 samples transmitted in one and the same frequency band but with cross-polarization, each track comprising an antenna, these antennas receiving according to a cross polarization, a receiver receiving the signal from the antenna, a transposition circuit to transpose the signal from the receiver into a base band, an analog to digital converter receiving the transposed signal to provide N/2 samples, the samples coming from the two tracks being then sent to an adder, then to a fast Fourier transform circuit to demodulate the signals coming from this adder.

10. Receiver for receiving signals transmitted according to the process of claim 2, characterized in that it includes two reception tracks, each able to receive the signals corresponding to N/2 samples transmitted in one and the same frequency band but with cross-polarization, each track comprising an antenna, these antennas receiving according to a cross polarization, a receiver receiving the signal from the antenna, a transposition circuit to transpose the signal from the receiver into a base band, an analog to digital converter receiving the transposed signal to provide N/2 samples, the samples coming from the two tracks being then sent to an adder, then to a fast Fourier transform circuit to demodulate the signals coming from this adder.

11. Receiver for receiving signals transmitted according to the process of claim 3, characterized in that it includes two reception tracks, each able to receive the signals corresponding to N/2 samples transmitted in one and the same frequency band but with cross-polarization, each track comprising an antenna, these antennas receiving according to a cross polarization, a receiver receiving the signal from the antenna, a transposition circuit to transpose the signal from the receiver into a base band, an analog to digital converter receiving the transposed signal to provide N/2 samples, the samples coming from the two tracks being then sent to an adder, then to a fast Fourier transform circuit to demodulate the signals coming from this adder.

12. Receiver for receiving signals transmitted according to the process of claim 4, characterized in that it includes two reception tracks, each able to receive the signals corresponding to N/2 samples transmitted in one and the same frequency band but with cross-polarization, each track comprising an antenna, these antennas receiving according to a cross polarization, a receiver receiving the signal from the antenna, a transposition circuit to transpose the signal from the receiver into a base band, an analog to digital converter receiving the transposed signal to provide N/2 samples, the samples coming from the two tracks being then sent to an adder, then to a fast Fourier transform circuit to demodulate the signals coming from this adder.

13. Receiver for receiving signals transmitted according to the process of claim 1, characterized in that it includes two reception tracks, each able to receive the signals corresponding to N/2 samples transmitted in one and the same frequency band but with cross-polarization, each track comprising an antenna, these antennas receiving, according to a cross polarization, a receiver receiving the signal from the antenna, a transposition circuit to transpose the signal from the receiver into a base band, an analog to digital converter receiving the transposed signal to provide N/2 samples, a fast Fourier transform circuit to demodulate these N/2 samples, the outputs of the two tracks being coupled by a coupler.

14. Receiver for receiving signals transmitted according to the process of claim 2, characterized in that it includes two reception tracks, each able to receive the signals corresponding to N/2 samples transmitted in one and the same frequency band but with cross-polarization, each track comprising an antenna, these antennas receiving, according to a cross polarization, a receiver receiving the signal from the antenna, a transposition circuit to transpose the signal from the receiver into a base band, an analog to digital converter receiving the transposed signal to provide N/2 samples, a fast Fourier transform circuit to demodulate these N/2 samples, the outputs of the two tracks being coupled by a coupler.

15. Receiver for receiving signals transmitted according to the process of claim 3, characterized in that it includes two reception tracks, each able to receive the signals corresponding to N/2 samples transmitted in one and the same frequency band but with cross-polarization, each track comprising an antenna, these antennas receiving, according to a cross polarization, a receiver receiving the signal from the antenna, a transposition circuit to transpose the signal from the receiver into a base band, an analog to digital converter receiving the transposed signal to provide N/2 samples, a fast Fourier transform circuit to demodulate these N/2 samples, the outputs of the two tracks being coupled by a coupler.

16. Receiver for receiving signals transmitted according to the process of claim 4, characterized in that it includes two reception tracks, each able to receive the signals corresponding to N/2 samples transmitted in one and the same frequency band but with cross-polarization, each track comprising an antenna, these antennas receiving, according to a cross polarization, a receiver receiving the signal from the antenna, a transposition circuit to transpose the signal from the receiver into a base band, an analog to digital converter receiving the transposed signal to provide N/2 samples, a fast Fourier transform circuit to demodulate these N/2 samples, the outputs of the two tracks being coupled by a coupler.

17. Receiver according to claim 9, characterized in that it comprises means to recognize test packets.

* * * * *

UNITED STATES PATENT AND TRADEMARK OFFICE
CERTIFICATE OF CORRECTION

PATENT NO. : 6,201,785 B1　　　　　　　　　　　　　　　　　　　　Page 1 of 1
DATED : March 13, 2001
INVENTOR(S) : Yvon Fouche et al.

It is certified that error appears in the above-identified patent and that said Letters Patent is hereby corrected as shown below:

Title page,
The CPA should read as follows:

-- [45] Date of Patent:　　　　*Mar. 13, 2001 --

-- (*)　Notice:　　　The patent issued on a continued prosecution application filed under 37 CFR 1.53(d), and is subject to the twenty year patent term provisions of 35 U.S.C. 154(a)(2). --

Title page,
Item [87] should read as follows:

-- [87]　PCT Pub. No.:　　WO94/13077
　　　　　PCT Pub. Date:　　June 9, 1994 --

Signed and Sealed this

Sixteenth Day of October, 2001

*Attest:*

NICHOLAS P. GODICI
*Attesting Officer*　　Acting Director of the United States Patent and Trademark Office